US012265614B2

(12) United States Patent
Ron et al.

(10) Patent No.: US 12,265,614 B2
(45) Date of Patent: Apr. 1, 2025

(54) LABEL RECOMMENDATION FOR CYBERSECURITY CONTENT

(71) Applicant: INTERNATIONAL BUSINESS MACHINES CORPORATION, Armonk, NY (US)

(72) Inventors: Aviv Ron, Klachim (IL); Eitan Menahem, Be'er Sheva (IL); Anton Puzanov, Mitzpe Ramon (IL); Bar Haim, Sufa (IL); Eitan Chertok, Negev Beer Sheva (IL); Romy Varga, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 18/052,267

(22) Filed: Nov. 3, 2022

(65) Prior Publication Data
US 2024/0152606 A1    May 9, 2024

(51) Int. Cl.
*G06F 21/55*    (2013.01)
*G06F 18/22*    (2023.01)
(52) U.S. Cl.
CPC ............ *G06F 21/554* (2013.01); *G06F 18/22* (2023.01)
(58) Field of Classification Search
CPC ............ G06F 16/35–355; G06F 18/22; G06F 21/55–554; G06N 20/00; H04L 63/1408–1425
See application file for complete search history.

(56) References Cited

U.S. PATENT DOCUMENTS

| 2018/0365417 | A1* | 12/2018 | Wu | G06N 20/00 |
| 2019/0347282 | A1* | 11/2019 | Cai | G06N 5/022 |
| 2021/0216928 | A1 | 7/2021 | O'Toole | |
| 2022/0019674 | A1 | 1/2022 | Frey | |
| 2022/0036175 | A1 | 2/2022 | Krishnamurthy | |

FOREIGN PATENT DOCUMENTS

CN    112149818 A    12/2020

OTHER PUBLICATIONS

Bridges et al., "Automatic Labeling for Entity Extraction in Cyber Security", Published by arXiv:1308.4941v3 {cs.IR} Jun. 9, 2014, 11 Pgs.
Ishii et al., "A Study of Classification of Texts into Categories of Cybersecurity Incident and Attack with Topic Models", Copyright 2022 by Scitepress,Science and Technology Publications, Lda, DOI: 10.5220/0009099696390646, 8 Pgs.
Lin.,"Attack Tactic Labeling for Cyber Threat Hunting", International Conference on Advanced Communications Technology ICACT2022 Feb. 13-16, 2022, IEEE Xplore, ISBN 979-11-88428-09-0.

\* cited by examiner

*Primary Examiner* — Kevin Bechtel
(74) *Attorney, Agent, or Firm* — Stosch Sabo

(57) ABSTRACT

Described are techniques for automated labeling of cybersecurity incidents. The techniques include generating a set of labels for a received cybersecurity incident based on features of the received cybersecurity incident. The techniques further include prioritizing the set of labels to generate a subset of labels, and associating the subset of labels to the received cybersecurity incident.

20 Claims, 7 Drawing Sheets

LABEL RECOMMENDATION FOR CYBERSECURITY CONTENT

BACKGROUND

The present disclosure relates to cybersecurity incident response, and, more specifically, to label recommendation in Security Orchestration, Automation, and Response (SOAR) platforms.

Security Operation Centers (SOCs) are organizations responsible for receiving, investigating, and responding to cybersecurity alerts from connected cybersecurity systems. SOCs can use SOAR platforms to collect data from multiple cybersecurity systems, evaluate the data, and apply mitigation measures to protect underlying hardware and software resources.

SUMMARY

Aspects of the present disclosure are directed toward a computer-implemented method comprising generating a set of labels for a received cybersecurity incident based on features of the received cybersecurity incident. The method further comprises prioritizing the set of labels to generate a subset of labels, and associating the subset of labels to the received cybersecurity incident.

Additional aspects of the present disclosure are directed to systems and computer program products configured to perform the method described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1:
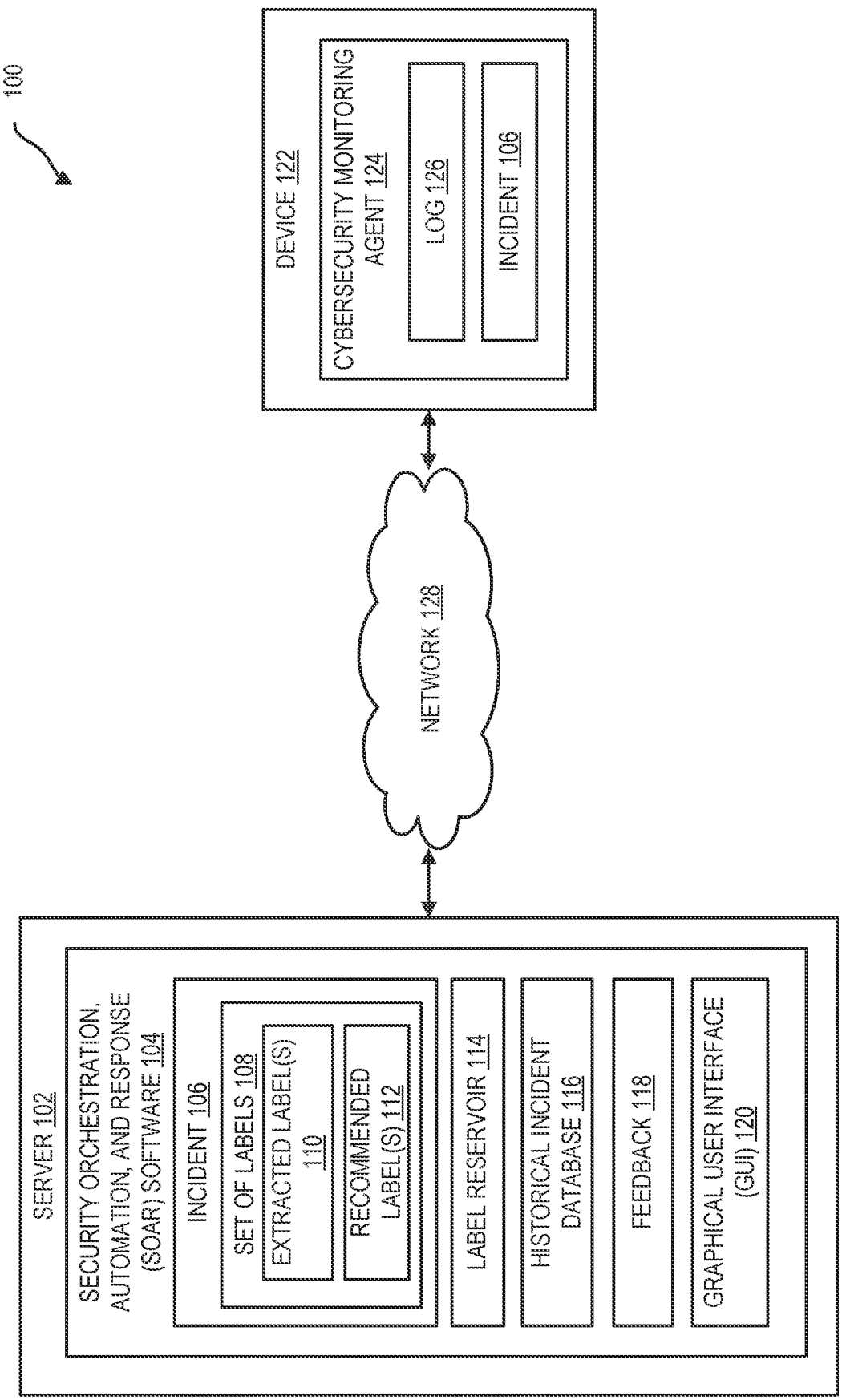
FIG. 1 illustrates a block diagram of an example computational environment implementing Security Orchestration, Automation, and Response (SOAR) software with automated incident labeling, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward cybersecurity incident response, and, more specifically, to label recommendation in Security Orchestration, Automation, and Response (SOAR) platforms. While not limited to such applications, embodiments of the present disclosure may be better understood in light of the aforementioned context.

Security Operations Center (SOC) analysts can receive security incidents from aggregated cybersecurity systems (e.g., using a SOAR platform). Incoming security incidents can include free-form text and/or structural text elements. For example, security incidents can include information such as, but not limited to, incident title, incident description, and/or artifacts as Indicators of Compromise (IOC). IOC artifacts can include digital forensic data such as suspicious files, suspicious applications, suspicious processes, and the like.

Upon receiving a security incident, one or more SOC analysts can manually determine whether the received security incident reflects a compromise or threat, or whether the received security incident is a false positive. Given the manual nature of incident disposition and the sheer volume of incidents, SOCs can have delays in evaluating security incidents and/or analyst errors when evaluating security incidents.

Aspects of the present disclosure are directed toward increasing SOC analyst efficiency when evaluating cybersecurity incidents generated in SOAR platforms. More specifically, aspects of the present disclosure are directed toward automatically generating labels for received cybersecurity incidents. By automatically labeling received cybersecurity incidents with accurate and useful information, SOC analysts can evaluate and disposition received cybersecurity incidents with increased efficiency and accuracy, thereby improving the security posture of the organization this SOAR system is deployed in.

More specifically, aspects of the present disclosure include, but are not limited to, (i) building a label reservoir from which to select labels for received cybersecurity incidents, (ii) selecting labels for a received cybersecurity incident based on features of the received cybersecurity incident, (iii) generating additional labels for the received cybersecurity incident based on similarities between the received cybersecurity incident and historical, labeled cybersecurity incidents, (iv) prioritizing the selected labels (e.g., from ii) and the generated additional labels (e.g., from iii) so that a selective amount of useful information is presented to a SOC analyst, and (v) incorporating user feedback (e.g., labels manually added or removed by a SOC analyst during evaluation of the received cybersecurity incident) into the aforementioned method to improve the accuracy of future automated labeling of future cybersecurity incidents.

Aspects of the present disclosure realize numerous advantages. At a high level, automated, accurate, and prioritized labelling of cybersecurity incidents reduces the time required for a SOC analyst to evaluate each cybersecurity incident and increases the accuracy with which each cybersecurity incident is dispositioned. In this way, aspects of the present disclosure increase efficiency and cybersecurity. As to specific advantages realized by specific aspects of the present disclosure, those advantages will be described with reference to the drawings.

Referring now to the figures, FIG. 1 illustrates a block diagram of an example computational environment 100 implementing Security Orchestration, Automation, and Response (SOAR) software 104 with automated incident labeling, in accordance with some embodiments of the present disclosure. The example computational environment 100 includes a server 102 communicatively coupled to a device 122 via a network 128.

Server 102 is any computational configuration of hardware and/or software capable of implementing cybersecurity services. In some embodiments, server 102 can be any server, computer, mainframe, or other combination of computer hardware capable of executing software. In some embodiments, server 102 can be a virtual machine (VM), container instance, or other virtualized combination of discrete physical hardware resources.

Device 122 can be any computing device, storage device, networking device, or any other physical or virtual device comprised of, or mimicking, hardware and/or software which is subject to monitoring by one or more cybersecurity systems (e.g., Intrusion Detection Systems (IDS), Intrusion Prevention Systems (IPS), Security Information and Event Management (STEM) systems, etc.). In some embodiments, device 122 can be any computer, desktop, laptop, tablet, wearable device, smartphone, other user device, storage device, computational device, networking device, or any other computational device subject to monitoring by one or more cybersecurity systems.

Although a single device 122 is shown, this is purely for illustrative purposes. In embodiments, there can be tens, hundreds, thousands, or even millions of devices for which the server 102 aggregates security incidents. Furthermore, for simplification, FIG. 1 does not show numerous intermediary cybersecurity functionalities (e.g., IDS, IPS, STEM, network firewalls, anti-virus software, packet sniffing software, and the like). One or more intermediary cybersecurity functionalities can collect data from each device 122, and the server 102 can aggregate the collected data according to SOAR software 104.

The network 128 can be a local area network (LAN), a wide area network (WAN), an intranet, the Internet, or any other network 128 or group of networks 128 capable of continuously, semi-continuously, or intermittently connecting (directly or indirectly) the aforementioned components together.

Server 102 can implement SOAR software 104. SOAR software 104 can be configured to aggregate cybersecurity information from numerous cybersecurity functionalities monitoring a set of devices 122 for cybersecurity threats. In accordance with embodiments of the present disclosure, SOAR software 104 is configured to generate automatic labels for received incidents 106. SOAR software 104 should be understood to encompass not merely cybersecurity software explicitly categorized as SOAR, but any cybersecurity software configured to handled cybersecurity incidents now known or later developed, such as, but not limited to, Security Information and Event Management (STEM) software, eXtended Detection and Response (XDR) software, Endpoint Detection and Response (EDR), and/or other cybersecurity software.

Incident 106 can be a cybersecurity incident generated by one of, or a combination of, information from one or more cybersecurity functionalities executing in the example computational environment 100. In some embodiments, incident 106 comprises free-form text and/or structural text elements. For example, incident 106 can include information such as, but not limited to, incident title, incident description, and/or artifacts as Indicators of Compromise (IOC). IOC artifacts can include digital forensic data such as suspicious files, suspicious applications, suspicious processes, and the like.

In response to receiving the incident 106, the SOAR software 104 can be configured to automatically generate a set of labels 108 for the incident 106. The set of labels 108 can include one or more extracted labels 110 and/or one or more recommended labels 112. Extracted labels 110 can refer to labels generated from the content of the incident 106. For example, an extracted label 110 can be a match between a portion of text in the incident 106 and an entry in a label reservoir 114. Recommended labels 112 can be generated by identifying incidents in a historical incident database 116 that are sufficiently similar to the incident 106 and applying one or more labels from the similar incident as recommended labels 112 in the set of labels 108 associated with the incident 106.

Advantageously, automatically applying labels to incident 106 can increase the speed and accuracy with which a SOC analyst can disposition the incident 106. Furthermore, by generating labels from different sources (e.g., extracted labels 110 from the incident 106 and recommended labels 112 from similar, historical incidents), the set of labels 108 can exhibit improved accuracy and utility relative to labels generated by a single mechanism. For example, recommended labels 112 from similar, historical incidents can provide labels to the incident 106 which do not match any text in the incident 106 yet which still provide useful information regarding the incident 106.

Label reservoir 114 can be a set of known labels that can be applied to an incident. In some embodiments, label reservoir 114 includes categories of labels and/or hierarchies of labels for improved search and use of labels in the label reservoir 114.

Historical incident database 116 includes a corpus of historical incidents and their associated labels. In some embodiments, incident 106 and its associated set of labels 108 can be added to the historical incident database 116 following disposition of the incident 106 (and incorporating any changes to the set of labels 108 made by a SOC analyst when reviewing the incident 106).

Feedback 118 can receive changes to the set of labels 108 made by a SOC analyst while evaluating the incident 106. Feedback 118 can include added labels, removed labels, or otherwise changed labels. Graphical User Interface (GUI) 120 can present the incident 106 with the set of labels 108 to a SOC analyst. GUI 120 can likewise receive feedback 118.

Server 102 is communicatively coupled to device 122. Device 122 implements a cybersecurity monitoring agent 124. The cybersecurity monitoring agent 124 can be any cybersecurity functionality deployed to monitor and/or protect the device 122 from cybersecurity threats. The cybersecurity monitoring agent 124 can generate a log 126 storing data associated with the monitoring. Unexpected patterns or datapoints, abnormal patterns or datapoints, or known malicious patterns or datapoints in log 126 can be used to generate incident 106. Incident 106 can be transferred to SOAR software 104 of server 102 for automatic labeling and disposition as previously discussed.

Although cybersecurity monitoring agent 124 is shown as initiating incident 106 in FIG. 1, in other embodiments, the SOAR software 104 can create incident 106 based on a suspicious pattern of behavior in the data of multiple aggregated types of cybersecurity functionalities, where none of the individual cybersecurity functionalities necessarily identify a threat, but where the threat becomes identifiable in light of the aggregated data.

FIG. 1 is for illustrative purposes and should not be construed as limiting. More, fewer, and/or different components than the components illustrated in FIG. 1 can be present while remaining within the spirit and scope of the present disclosure. Further, illustrated components can be separated into multiple, discrete components, and/or multiple discrete components can be combined together into a single component, while remaining within the spirit and scope of the present disclosure.

Figure 2:
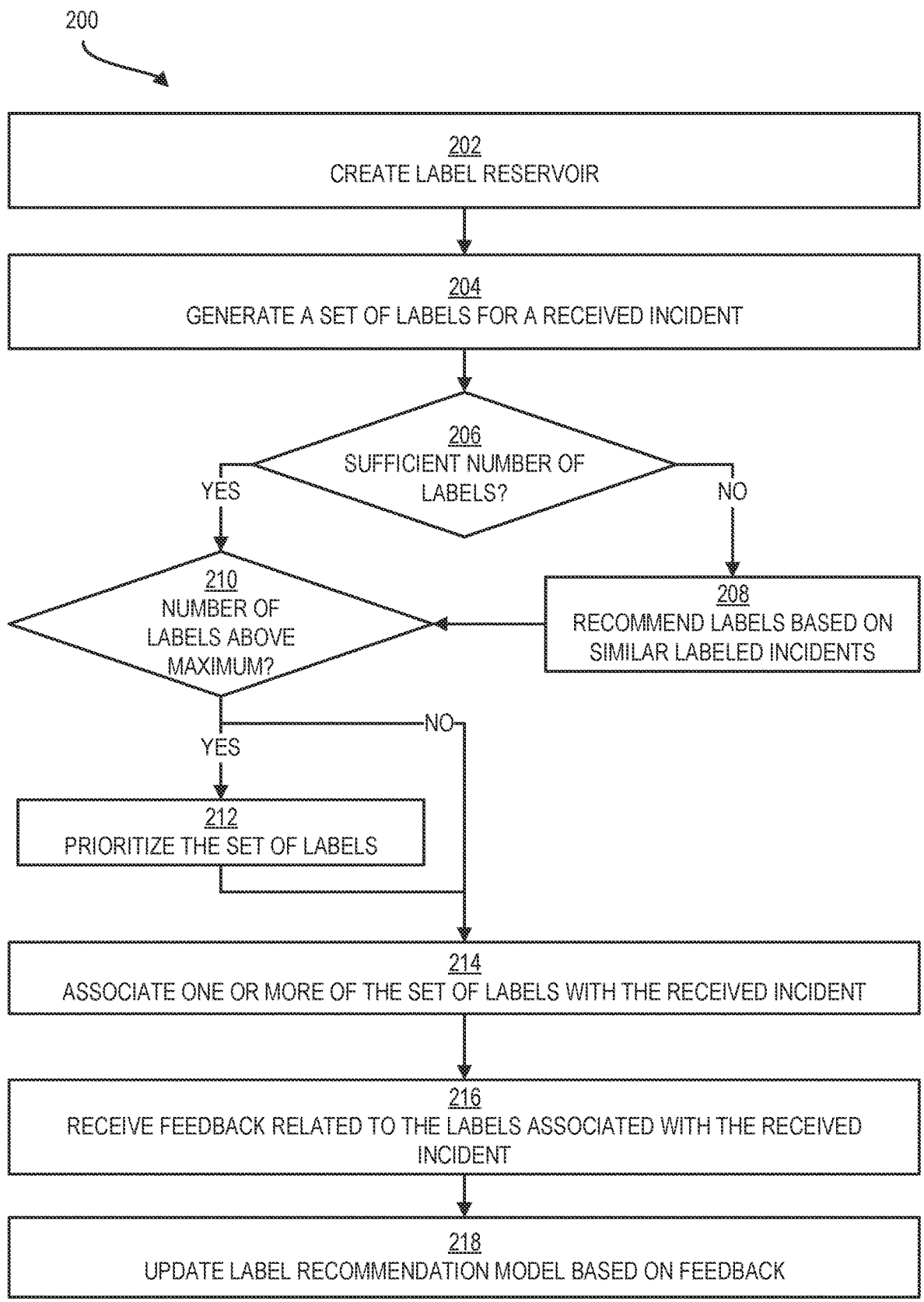
FIG. 2 illustrates a flowchart of an example method for implementing SOAR software with automated incident labeling, in accordance with some embodiments of the present disclosure.

FIG. 2 illustrates a flowchart of an example method 200 for implementing SOAR software with automated incident labeling, in accordance with some embodiments of the present disclosure. In some embodiments, the method 200 is implemented by a computer, a server, a processor, a data processing system, a user device, or another configuration of hardware and/or software.

Operation 202 includes creating a label reservoir. The label reservoir can be, for example, a set L which contains K possible labels. In some embodiments, aspects of the present disclosure can generate N recommended labels for a given incident. In other words, label reservoir $L=\{l_0, \ldots, l_{k-1}\}$, and it can output recommended labels $\{l_0, \ldots, l_{n-1}\} \in L$ for a received incident.

Operation 202 can create the label reservoir using various techniques such as, but not limited to, (i) using text analysis techniques for keyword detection and extraction (e.g., "Gensim" software library) to extract keywords as labels from a corpus of cybersecurity information (e.g., known attack technique sources such as MITRE ATT&CK® which contain textual content), (ii) using known dictionaries of domain related content (e.g., lists of known malicious files, software types, known protocols, threat intelligence feeds, etc.), and/or (iii) creation by a Subject Matter Expert (SME).

In some embodiments, the label reservoir includes categories and/or hierarchies of labels. As an example, the label "cryptolocker" can be a child label of "ransomware." As another example, the label "APT32" can be a child label of "Threat Actor." In such embodiments, operation 202 can also include generating the label hierarchy. Label hierarchies can be generated by, for example, manual mapping by a SME. In other embodiments, aspects of the present disclosure can find a best matching category for each label using cosine similarity of vectors corresponding to labels. In such embodiments, each label and all high-level categories can be mapped to a vectorial representation (e.g., using a pretrained embedding model). Then, each label can be assigned to a high-level category that exhibits the highest cosine similarity.

Operation 204 includes generating a set of labels for a received incident. The set of labels can include labels extracted from information associated with the incident. Operation 204 is discussed in more detail hereinafter with respect to FIG. 3.

Operation 206 includes determining if the set of labels includes a sufficient number of labels. For example, operation 206 can compare the number of labels generated in operation 204 to a threshold number of labels representing a minimum number of labels. In other words, operation 206 can ensure that every incident includes a sufficient number of labels to enable a SOC analyst to evaluate the incident.

If not (206: NO), the method 200 proceeds to operation 208 and recommends one or more labels based on similar labeled historical incidents. In some embodiments, operation 208 calculates a similarity between the incident and each incident in a historical incident database of labeled incidents. The similarities can be calculated by one or more of word-level similarity, field similarity, and/or sentence-level similarity.

Regarding word-level similarity, it can measure similarity based on a number of shared words between the textual content of the incident and the respective historical labeled incident. The word-level similarity technique can utilize statistics such as Term Frequency (TF), Inverse Document Frequency (IDF), Best Matching (BM) 25 (e.g., BM25, BM25+, BM25F, etc.), and/or other word similarity statistics, now known or later developed.

Regarding the field similarity technique, it can measure similarity between fields (e.g., Internet Protocol (IP) address, time, title, etc.) of the incident and the respective historical labeled incident. The field similarity technique can determine similarity by evaluating the field level similarity by Jaccard Coefficient (e.g., the size of the intersection divided by the size of the union for two finite sets representing fields in incident and the respective historical labeled incident).

Regarding the sentence level similarity technique, it can measure similarity based on a cosine similarity between vectors generated from sentences of the textual content of the incident and the respective historical labeled incident. In some embodiments, each sentence is mapped to a vector using an embedding technique (e.g., Bidirectional Encoder Representations and Transformers (BERT)).

Regardless of how the similarity between incidents is calculated, a predetermined number (e.g., one or more) of most similar historical labeled incidents are ultimately selected. For a selected historical labeled incident, each label can be correlated to a high-level category (e.g., using the label hierarchy created in operation 202), and one or more of the high-level categories can be added to the incident as a label. Advantageously, using the high-level categories (instead of the specific labels) from the selected similar historical labeled incidents can reduce errors that may be caused by using specific labels from similar (but not identical) historical incidents. In some embodiments, the high-level labels can be weighted by the similarity score between the incident and the historical incident.

Alternatively, operation 208 can implement machine learning models to recommend labels. In such embodiments, historical labeled incidents can have incident features extracted, salient features identified (as they relate to the associated labels), and combinations of salient features and associated labels used to train a machine learning model to ingest a received incident and output predicted labels. Machine learning models can employ any number of machine learning algorithms such as, but not limited to, NLP, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, a machine learning model can be configured to perform machine learning on a historical incident database to determine associations between incident features and labels. In such embodiments, the historical incident database can contain historical incidents and their associated labels, and machine learning algorithms can be implemented to extract features from the historical incidents, select a subset of the extracted features that are salient features (where the salient features can have a strong correlation with certain labels) and train the machine learning model to predict labels based on the salient features.

Regarding feature extraction, it can utilize any feature extraction techniques now known or later developed. For example, feature extraction can rely on words in the incident, where respective words are used as features. Optionally, such techniques can employ NLP to improve the effectiveness of the extracted features (e.g., lemmatization, stop word removal, TF-IDF statistics, etc.). As another option, feature extraction can rely on manually generated features from SME.

Regarding salient feature selection, it can utilize any feature selection techniques now known or later developed. As one example, salient features can be selected using low variance feature removal techniques. As another example, salient features can be selected using model-based feature importance techniques.

The machine learning model can be trained on the aforementioned data using one or more of the following example techniques (e.g., for feature extraction, features selection, and/or classifier training): K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques. After training, the machine learning model can ingest an incident and output one or more recommended labels.

Regardless of the techniques used to recommend labels based on similar, labeled, historical incidents in operation 208, the method 200 then proceeds to operation 210. Likewise, referring back to operation 206, if it is determined that there are a sufficient number of labels (206: YES), then the method 200 proceeds to operation 210.

Operation 210 includes determining if the number of labels is above a maximum number of labels. Operation 210 can be used to reduce the number of labels if too many labels are generated for the incident (insofar as too many labels can reduce the ability of an SOC analyst to succinctly understand the salient issues of the incident). If so (210: YES), then the method 200 proceeds to operation 212 and prioritizes the labels. Operation 212 is discussed in more detail hereinafter with respect to FIG. 4. The method 200 then proceeds to operation 214.

Referring back to operation 210, if the number of labels is not above a threshold (210: NO), then the method 200 proceeds to operation 214. Operation 214 includes associating one or more of the set of labels with the received incident. In some embodiments, operation 214 can associate a subset of the set of labels with the received incident (e.g., according to prioritization results in operation 212). In other embodiments, operation 214 can associate each of the set of labels with the received incident. Operation 214 can include storing the received incident with the associated labels in a SOAR platform. In some embodiments, operation 214 includes transmitting the received incident and the associated labels to a SOAR platform console for evaluation and disposition by a SOC analyst. In such embodiments, operation 214 can include presenting the received incident and the associated labels to a GUI associated with the SOAR platform console.

Operation 216 includes receiving feedback related to the labels associated with the received incident. Operation 216 can be based on a SOC analyst interacting with the received incident and its associated labels while evaluating and dispositioning the received incident. For example, the feedback can include added labels, removed labels, and/or changed labels relative to the labels associated with the received incident.

Operation 218 includes updating the label recommendation model based on the feedback. For example, operation 218 can include modifying the associated labels with the received incident so that the received incident is stored (e.g., in a repository of historical labeled incidents) with the modified labels. Operations 216-218 are discussed in more detail hereinafter with respect to FIG. 5.

Figure 3:
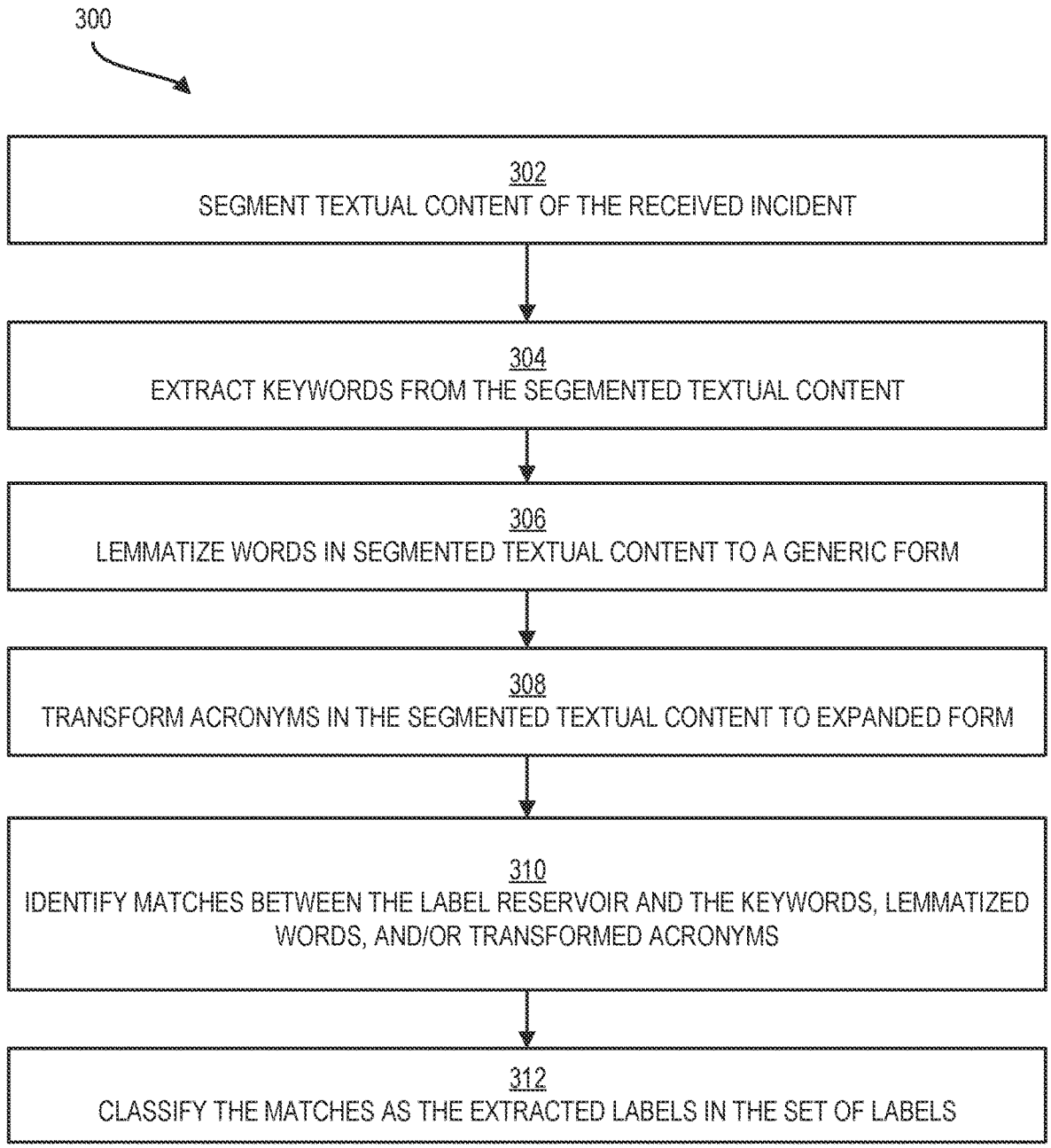
FIG. 3 illustrates a flowchart of an example method for generating a set of labels for a cybersecurity incident using information derived from the cybersecurity incident, in accordance with some embodiments of the present disclosure.

FIG. 3 illustrates a flowchart of an example method 300 for generating a set of labels for a cybersecurity incident using information derived from the cybersecurity incident, in accordance with some embodiments of the present disclosure. In some embodiments, the method 300 is implemented by a computer, a server, a processor, a data processing system, a user device, or another configuration of hardware and/or software. In some embodiments, the method 300 is a sub-method of operation 204 of FIG. 2.

Operation 302 includes segmenting textual content of the received incident. Operation 302 can segment the textual content according to textual content characteristics (e.g., title, description, artifacts, etc.).

Operation 304 includes extracting keywords from the segmented textual content. Operation 304 can be performed using known NLP detection and extraction techniques for keywords in text.

Operation 306 includes lemmatizing words in the segmented textual content to a generic form. Operation 306 can include tokenizing the textual content prior to performing lemmatization and/or performing other NLP techniques to the segmented textual content to enable robust lemmatization.

Operation 308 includes transforming acronyms in the segmented textual content to an expanded form. Operation 308 can utilize any number of NLP techniques and/or algorithms for transforming acronyms in the segmented textual content to an expanded form. For example, aspects of the present disclosure can automatically compare words of less than or equal to a predetermined number of characters (e.g., four characters) to a database of acronyms and their associated expanded forms.

Operation 310 includes identifying matches between entries in the label reservoir and the keywords, lemmatized words, and/or transformed acronyms generated in operations 304, 306, and 308. Operation 310 can be configured to identify exact matches and/or partial matches. When operation 310 is configured to identify partial matches, aspects of the present disclosure can utilize a threshold (e.g., matching threshold, confidence threshold, etc.) to ensure that partial matches are sufficiently likely to be accurate matches.

Operation 312 includes classifying the matches identified in operation 310 as the extracted labels in the set of labels (e.g., extracted labels 110 of FIG. 1).

Figure 4:
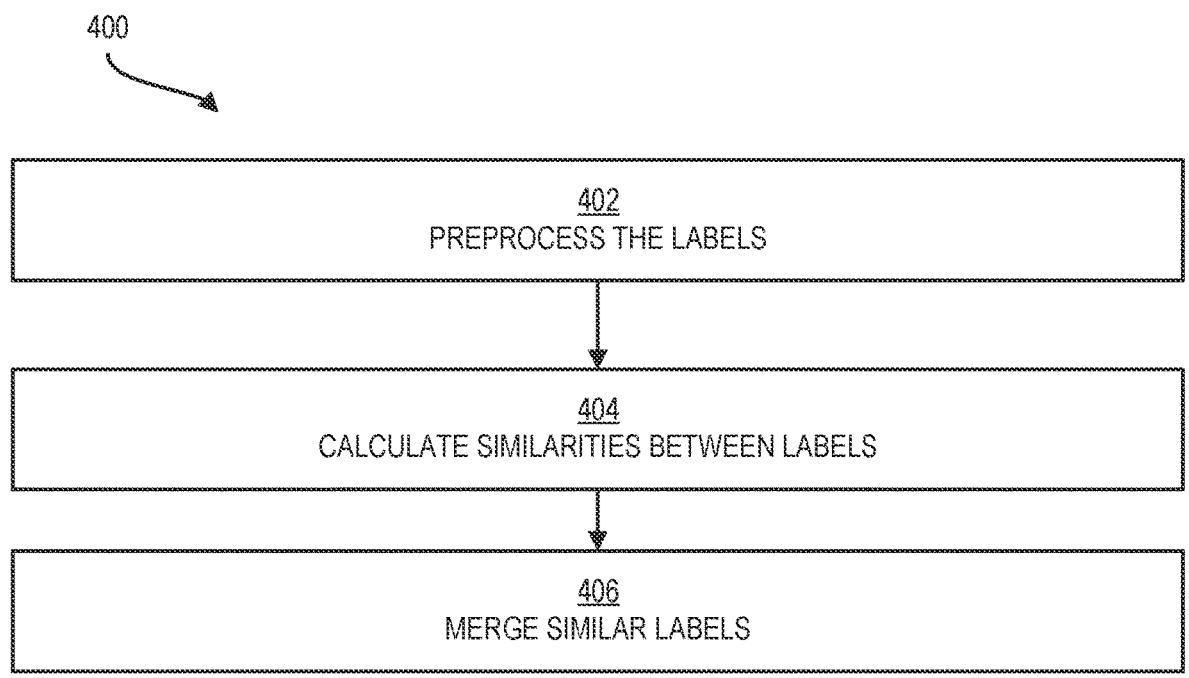
FIG. 4 illustrates a flowchart of an example method for prioritizing labels, in accordance with some embodiments of the present disclosure.

FIG. 4 illustrates a flowchart of an example method 400 for prioritizing labels, in accordance with some embodiments of the present disclosure. In some embodiments, the method 400 is implemented by a computer, a server, a processor, a data processing system, a user device, or another configuration of hardware and/or software. In some embodiments, the method 400 is a sub-method of operation 212 of FIG. 2.

Operation 402 includes preprocessing the labels. Preprocessing labels can include removing duplicate labels, removing labels not satisfying minimum length requirements, and/or removing labels that are otherwise determined to be irregular. Preprocessing labels can also include associating categories with the labels. In some embodiments, labels associated with a category can be considered entities.

Operation 404 includes calculating similarities between labels. For entities (e.g., labels associated with a category), labels can be characterized as similar or dissimilar based on similar or dissimilar associated categories. For labels without an associated category, similarities can be determined using cosine similarities between vectorial representations of labels.

Operation 406 includes merging similar labels. For entities (e.g., labels associated with a category), labels with similar associated categories can be merged. For labels without an associated category, the labels can be merged using a hierarchical clustering method in which, for any two merged labels, the label with a higher document frequency (e.g., the most common) in the associated incident (or database of historical labeled incidents) can be the resulting label. Advantageously, by merging similar labels, operation 406 ensures a diverse set of labels are associated with an incident, where the diverse labels provide a more complete understanding of the incident than many, similar labels.

Figure 5:
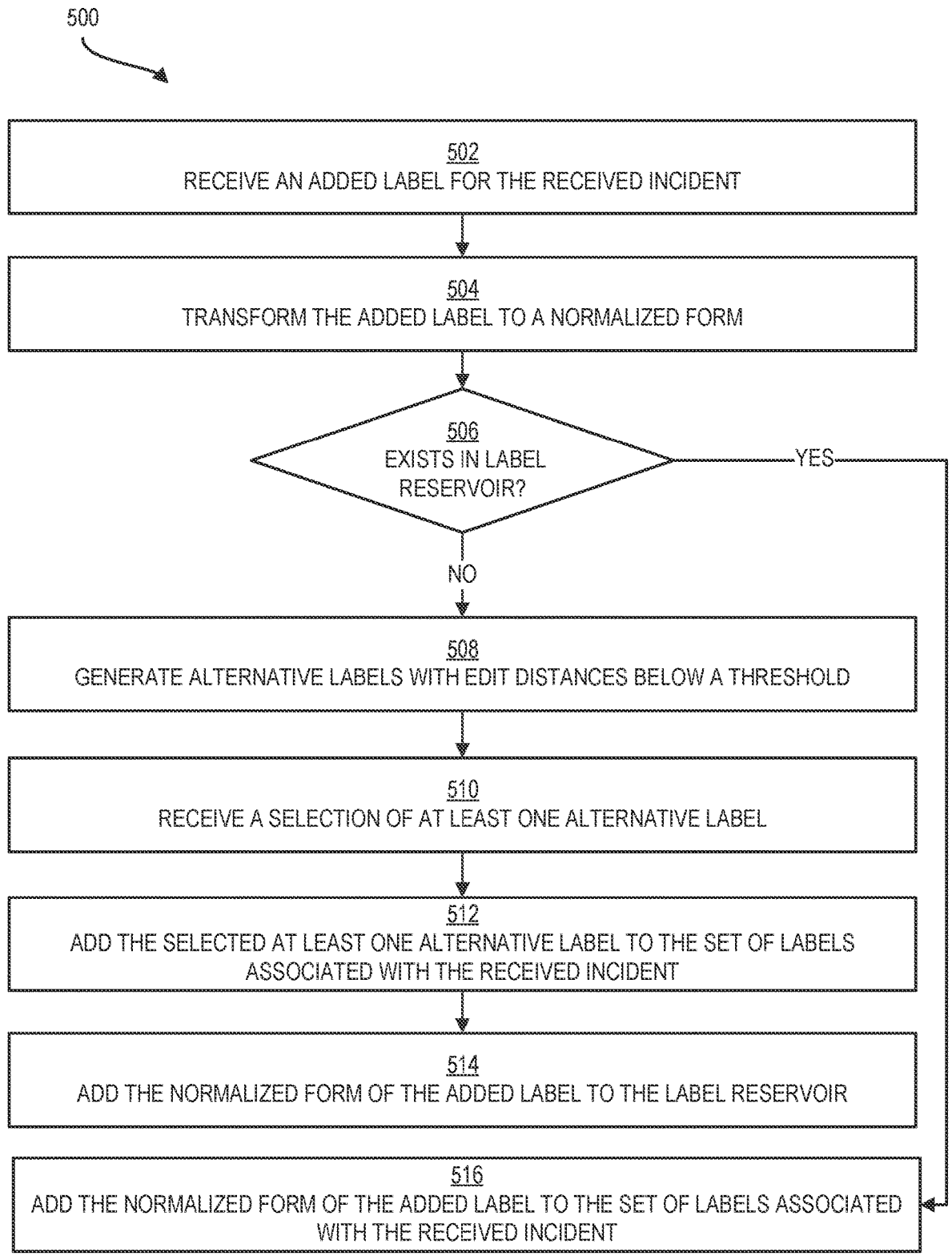
FIG. 5 illustrates a flowchart of an example method for receiving feedback related to automated incident labeling, in accordance with some embodiments of the present disclosure.

FIG. 5 illustrates a flowchart of an example method 500 for receiving feedback related to automated incident labeling, in accordance with some embodiments of the present disclosure. In some embodiments, the method 500 is implemented by a computer, a server, a processor, a data processing system, a user device, or another configuration of hardware and/or software. In some embodiments, the method 500 is a sub-method of operations 216 and/or 218 of FIG. 2.

Operation 502 includes receiving an added label for the received incident. The added label can be, for example, a label provided by a SOC analyst evaluating and dispositioning the received incident.

Operation 504 includes transforming the added label to a normalized form. Operation 504 can utilize lemmatization and/or other NLP techniques to convert the added label to a normalized form.

Operation 506 includes determining whether the normalized form of the added label exists in the label reservoir. If so (506: YES), then the method 500 proceeds to operation 516 and adds the normalized form of the added label to the set of labels associated with the received incident. If not (506: NO), then the method 500 proceeds to operation 508.

Operation 508 includes generating alternative labels with an edit distance below a threshold to the normalized form of the added label. The alternative labels can be presented to a GUI for selection by the SOC analyst. Operation 510 includes receiving a selection of at least one alternative label. Operation 512 includes adding the selected at least one alternative label to the set of labels associated with the received incident. Operation 514 includes adding the normalized form of the added label to the label reservoir. In this way, operation 514 can continue building the label reservoir with otherwise unknown labels.

Figure 6:
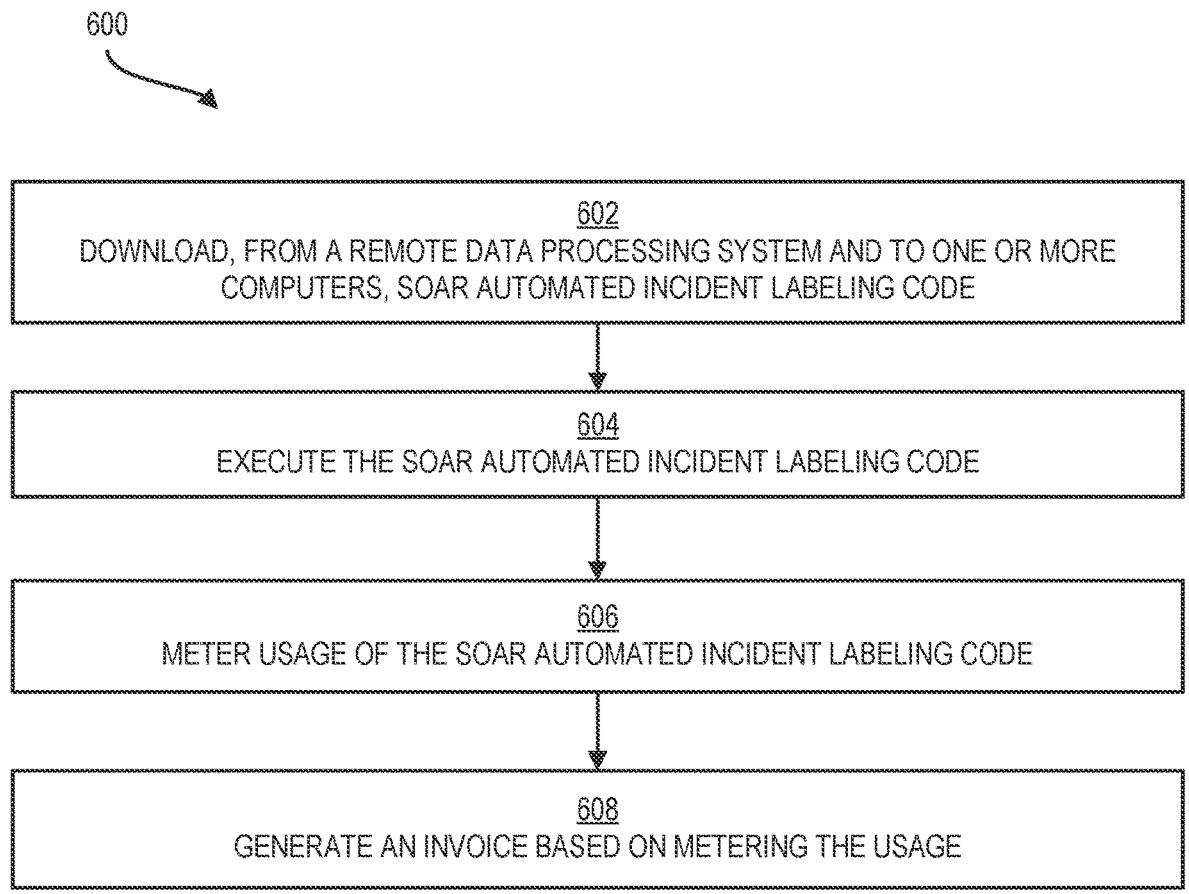
FIG. 6 illustrates a flowchart of an example method for downloading, deploying, metering, and billing usage of SOAR automated incident labeling code, in accordance with some embodiments of the present disclosure.

FIG. 6 illustrates a flowchart of an example method 600 for downloading, deploying, metering, and billing usage of SOAR automated incident labeling code, in accordance with some embodiments of the present disclosure. In some embodiments, the method 600 is implemented by a computer, a server, a processor, a data processing system, a user device, or another configuration of hardware and/or software. In some embodiments, the method 600 occurs concurrently with one or more operations of the method 200 of FIG. 2.

Operation 602 includes downloading, from a remote data processing system and to one or more computers (e.g., server 102), SOAR automated incident labeling code (e.g., SOAR software 104 of FIG. 1). Operation 604 includes executing the SOAR automated incident labeling code. Operation 604 can include performing any of the methods and/or functionalities discussed herein. Operation 606 includes metering usage of the SOAR automated incident labeling code. Usage can be metered by, for example, an amount of time the SOAR automated incident labeling code is used, a number of servers and/or devices deploying the SOAR automated incident labeling code, an amount of resources consumed by implementing the SOAR automated incident labeling code, a number of incidents processed and/or labels generated by implementing the SOAR automated incident labeling code, and/or other usage metering metrics. Operation 608 includes generating an invoice based on metering the usage.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 7:
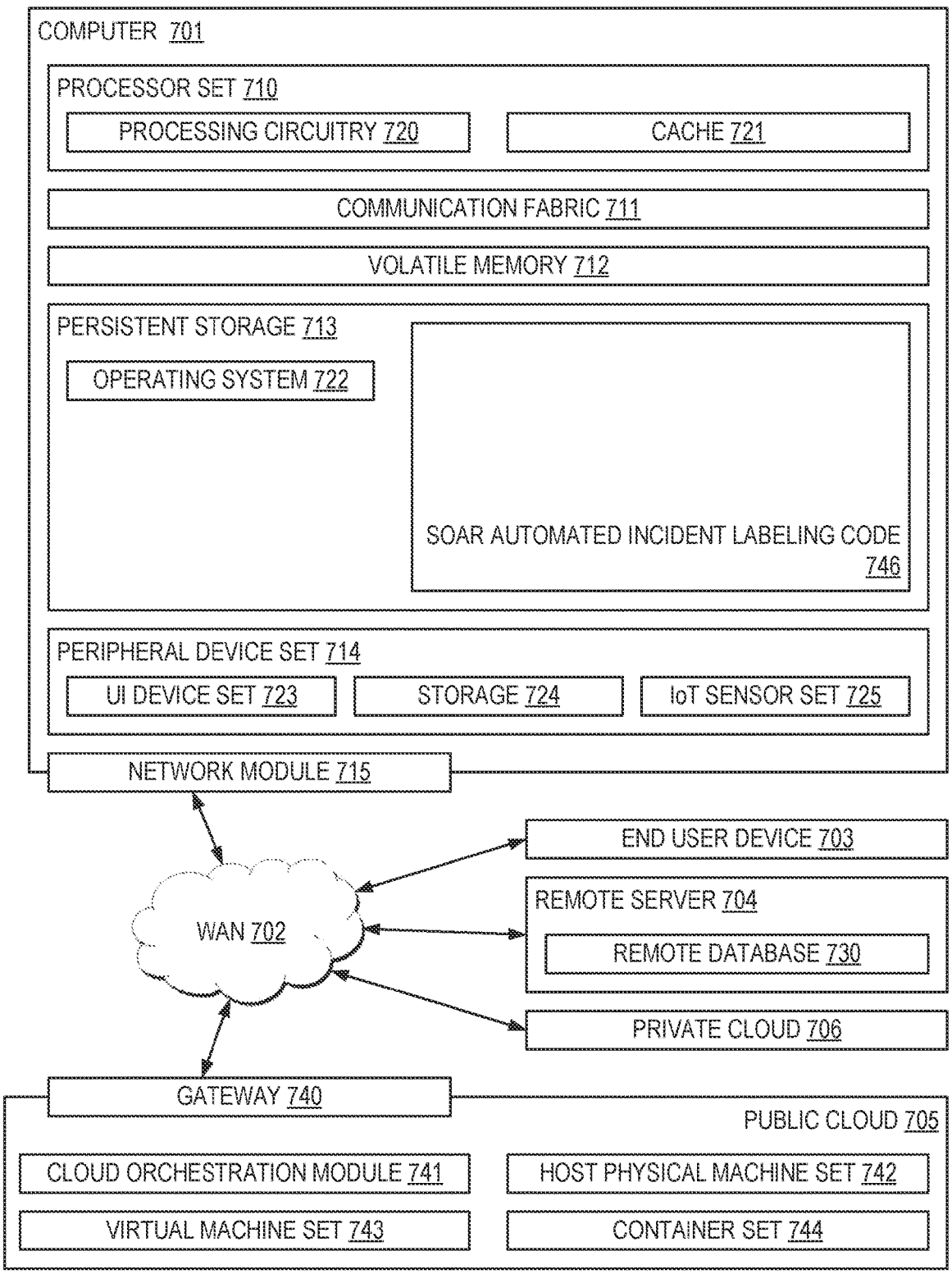
FIG. 7 illustrates a block diagram of an example computing environment, in accordance with some embodiments of the present disclosure.

FIG. 7 illustrates a block diagram of an example computing environment, in accordance with some embodiments of the present disclosure. Computing environment 700 contains an example of an environment for the execution of at least some of the computer code involved in performing the inventive methods, such as SOAR automated incident labeling code 746. In addition to SOAR automated incident labeling code 746, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and SOAR automated incident labeling code 746, as identified above), peripheral device set 714 (including user interface (UI), device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

COMPUTER 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

PROCESSOR SET 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in SOAR automated incident labeling code 746 in persistent storage 713.

COMMUNICATION FABRIC 711 is the signal conduction paths that allow the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 712 is any type of volatile memory now known or to be developed in the future. Examples include dynamic type random access memory (RAM) or static type RAM. Typically, the volatile memory is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

PERSISTENT STORAGE 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface type operating systems that employ a kernel. The code included in SOAR automated incident labeling code 746 typically includes at least some of the computer code involved in performing the inventive methods.

PERIPHERAL DEVICE SET 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

NETWORK MODULE 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

REMOTE SERVER 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

PUBLIC CLOUD 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any software configured to perform any portion of the methods described previously and/or implement any of the functionalities described previously) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes generating a set of labels for a received cybersecurity incident based on features of the received cybersecurity incident; identifying at least one labeled historical cybersecurity incident having a sufficient similarity to the received cybersecurity incident; applying at least one label associated with the at least one labeled historical cybersecurity incident to the set of labels for the received cybersecurity incident; prioritizing the set of labels to generate a subset of labels; and associating the subset of labels to the received cybersecurity incident.

Example 2 includes the features of Example 1. In this example, the method further comprises creating a label reservoir, and wherein generating the set of labels is based, at least in part, on matches between textual content associated with the received cybersecurity incident and labels in the label reservoir.

Example 3 includes the features of Example 2. In this example, creating the label reservoir is performed by at least one selected from a group consisting of: performing keyword detection and extraction from a corpus of cyberattack information, and using one or more dictionaries of cyberattack information.

Example 4 includes the features of any one of Examples 2 to 3. In this example, the label reservoir comprises a hierarchy of labels.

Example 5 includes the features of Example 4. In this example, the hierarchy of labels is generated by: mapping a label to a vectorial representation; mapping categories to vectorial representations; and associating one of the categories for the label based on a maximum cosine similarity between the vectorial representation of the label and a second vectorial representation of the one of the categories.

Example 6 includes the features of any one of Examples 1 to 5. In this example, generating the set of labels for the received cybersecurity incident further comprises: segmenting textual content from the received cybersecurity incident; extracting keywords from the segmented textual content; lemmatizing words in the segmented textual content to a generic form; transforming acronyms in the segmented textual content to an expanded form; identifying matches between the label reservoir and the keywords, lemmatized words, and the expanded forms of the acronyms; and classifying the matches as the set of labels for the received cybersecurity incident.

Example 7 includes the features of any one of Examples 1 to 6. In this example, identifying the at least one labeled historical cybersecurity incident having the sufficient similarity to the received cybersecurity incident is based on word level similarity between the at least one labeled historical cybersecurity incident and the received cybersecurity incident.

Example 8 includes the features of Example 7. In this example, the word level similarity is based on Best Matching 25 (BM25).

Example 9 includes the features of any one of Examples 1 to 6. In this example, identifying the at least one labeled historical cybersecurity incident having the sufficient similarity to the received cybersecurity incident is based on field similarity between the at least one labeled historical cybersecurity incident and the received cybersecurity incident.

Example 10 includes the features of Example 9. In this example, the field similarity comprises a Jaccard coefficient for fields in the at least one labeled historical cybersecurity incident and the received cybersecurity incident.

Example 11 includes the features of any one of Examples 1 to 6. In this example, identifying the at least one labeled historical cybersecurity incident having the sufficient similarity to the received cybersecurity incident is based on sentence level similarity between the at least one labeled historical cybersecurity incident and the received cybersecurity incident.

Example 12 includes the features of Example 11. In this example, the sentence level similarity is determined by cosine similarity between corresponding vector representations of sentences in the received cybersecurity incident and the at least one labeled historical cybersecurity incident.

Example 13 includes the features of any one of Examples 1 to 11. In this example, prioritizing the labels comprises preprocessing the set of labels by: removing duplicate labels; and removing labels not satisfying a predetermined range of lengths.

Example 14 includes the features of any one of Examples 1 to 12. In this example, prioritizing the labels comprises: calculating similarities between labels in the set of labels; and merging similar labels in the set of labels based on the calculated similarities.

Example 15 includes the features of Example 14. In this example, merging the similar labels in the set of labels based on the calculated similarities comprises: merging at least two labels with a similarity above a threshold; and retaining, as a new label of the at least two merged labels, a label with a highest document frequency.

Example 16 includes the features of any one of Examples 1 to 15. In this example, the method further comprising: receiving an added label for the received cybersecurity incident; transforming the added label to a normalized form; determining that the normalized form of the added label does not exist in the label reservoir; generating one or more alternative labels with an edit distance between the normalized form of the added label and each alternative label below a threshold; adding one or more selected alternative labels to the set of labels associated with the received cybersecurity incident; and adding the normalized form of the added label to the label reservoir.

Example 17 includes the features of any one of Examples 1 to 16. In this example, the method is performed by a server implementing Security Orchestration, Automation, and Response (SOAR) software.

Example 18 includes the features of Example 17. In this example, the method further comprises: metering usage of the SOAR software; and generating an invoice based on metering the usage of the SOAR software.

Example 19 is a system. The system includes one or more computer readable storage media storing program instructions; and one or more processors which, in response to executing the program instructions, are configured to perform a method according to any one of Examples 1 to 18, including or excluding optional features.

Example 20 is a computer program product. The computer program product includes one or more computer readable storage media, and program instructions collectively stored on the one or more computer readable storage media, the program instructions comprising instructions configured to cause one or more processors to perform a method according to any one of Examples 1 to 18, including or excluding optional features.

What is claimed is:

1. A computer-implemented method comprising:
generating a set of labels for a received cybersecurity incident based on features of the received cybersecurity incident;
generating, by a pre-trained Bidirectional Encoder Representations and Transformers (BERT) model, vector representations for the received cybersecurity incident and vector representations for a plurality of labeled historical cybersecurity incidents;
identifying at least one labeled historical cybersecurity incident having a sufficient similarity to the received cybersecurity incident based on a cosine similarity between corresponding vector representations of sentences in the received cybersecurity incident and corresponding vector representations of sentences in the at least one labeled historical cybersecurity incident;
applying at least one label associated with the at least one labeled historical cybersecurity incident to the set of labels for the received cybersecurity incident;
prioritizing the set of labels to generate a subset of labels; and
associating the subset of labels to the received cybersecurity incident.

2. The method of claim 1, wherein the method further comprises creating a label reservoir, and wherein generating the set of labels is based, at least in part, on matches between textual content associated with the received cybersecurity incident and labels in the label reservoir.

3. The method of claim 2, wherein creating the label reservoir is performed by at least one selected from a group consisting of:
performing keyword detection and extraction from a corpus of cyberattack information, and
using one or more dictionaries of cyberattack information.

4. The method of claim 2, wherein the label reservoir comprises a hierarchy of labels.

5. The method of claim 4, wherein the hierarchy of labels is generated by:
mapping a label to a vectorial representation;
mapping categories to vectorial representations; and
associating one of the categories for the label based on a maximum cosine similarity between the vectorial representation of the label and a second vectorial representation of the one of the categories.

6. The method of claim 1, wherein generating the set of labels for the received cybersecurity incident further comprises:
segmenting textual content from the received cybersecurity incident;
extracting keywords from the segmented textual content;
lemmatizing words in the segmented textual content to a generic form;
transforming acronyms in the segmented textual content to an expanded form;
identifying matches between the label reservoir and the keywords, lemmatized words, and the expanded forms of the acronyms; and
classifying the matches as the set of labels for the received cybersecurity incident.

7. The method of claim 1, wherein identifying the at least one labeled historical cybersecurity incident having the sufficient similarity to the received cybersecurity incident is based on word level similarity between the at least one labeled historical cybersecurity incident and the received cybersecurity incident.

8. The method of claim 7, wherein the word level similarity is based on Best Matching 25 (BM25).

9. The method of claim 1, wherein identifying the at least one labeled historical cybersecurity incident having the sufficient similarity to the received cybersecurity incident is based on field similarity between the at least one labeled historical cybersecurity incident and the received cybersecurity incident.

10. The method of claim 9, wherein the field similarity comprises a Jaccard coefficient for fields in the at least one labeled historical cybersecurity incident and the received cybersecurity incident.

11. The method of claim 1, wherein prioritizing the labels comprises preprocessing the set of labels by:
removing duplicate labels; and
removing labels not satisfying a predetermined range of lengths.

12. The method of claim 1, wherein prioritizing the labels comprises:
calculating similarities between labels in the set of labels; and
merging similar labels in the set of labels based on the calculated similarities.

13. The method of claim 12, wherein merging the similar labels in the set of labels based on the calculated similarities comprises:
merging at least two labels with a similarity above a threshold; and
retaining, as a new label of the at least two merged labels, a label with a highest document frequency.

14. The method of claim 1, further comprising:
receiving an added label for the received cybersecurity incident;
transforming the added label to a normalized form;
determining that the normalized form of the added label does not exist in the label reservoir;
generating one or more alternative labels with an edit distance between the normalized form of the added label and each alternative label below a threshold;
adding one or more selected alternative labels to the set of labels associated with the received cybersecurity incident; and
adding the normalized form of the added label to the label reservoir.

15. The method of claim 1, wherein the method is performed by a server implementing Security Orchestration, Automation, and Response (SOAR) software, and wherein the method further comprises:
metering usage of the SOAR software; and
generating an invoice based on metering the usage of the SOAR software.

16. The computer-implemented method of claim 1, further comprising:
applying Natural Language Processing (NLP) techniques including lemmatization, stop word removal, and Term Frequency-Inverse Document Frequency (TF-IDF) statistics to generate the features of the received cybersecurity incident, wherein the features are based on words included in the received cybersecurity incident.

17. A system comprising:
one or more computer readable storage media storing program instructions; and
one or more processors which, in response to executing the program instructions, are configured to perform a method comprising:
generating a set of labels for a received cybersecurity incident based on features of the received cybersecurity incident;
generating, by a pre-trained Bidirectional Encoder Representations and Transformers (BERT) model, vector representations for the received cybersecurity incident and vector representations for a plurality of labeled historical cybersecurity incidents;
identifying at least one labeled historical cybersecurity incident having a sufficient similarity to the received cybersecurity incident based on a cosine similarity between corresponding vector representations of sentences in the received cybersecurity incident and corresponding vector representations of sentences in the at least one labeled historical cybersecurity incident;
applying at least one label associated with the at least one labeled historical cybersecurity incident to the set of labels for the received cybersecurity incident;
prioritizing the set of labels to generate a subset of labels; and
associating the subset of labels to the received cybersecurity incident.

18. The system of claim 17, wherein the method further comprises:
applying Natural Language Processing (NLP) techniques including lemmatization, stop word removal, and Term Frequency-Inverse Document Frequency (TF-IDF) statistics to generate the features of the received cybersecurity incident, wherein the features are based on words included in the received cybersecurity incident.

19. A computer program product comprising one or more computer readable storage media, and program instructions collectively stored on the one or more computer readable storage media, the program instructions comprising instructions configured to cause one or more processors to perform a method comprising:
generating a set of labels for a received cybersecurity incident based on features of the received cybersecurity incident;
generating, by a pre-trained Bidirectional Encoder Representations and Transformers (BERT) model, vector representations for the received cybersecurity incident and vector representations for a plurality of labeled historical cybersecurity incidents;
identifying at least one labeled historical cybersecurity incident having a sufficient similarity to the received cybersecurity incident based on a cosine similarity between corresponding vector representations of sentences in the received cybersecurity incident and corresponding vector representations of sentences in the at least one labeled historical cybersecurity incident;
applying at least one label associated with the at least one labeled historical cybersecurity incident to the set of labels for the received cybersecurity incident;
prioritizing the set of labels to generate a subset of labels; and
associating the subset of labels to the received cybersecurity incident.

20. The computer program product of claim 19, wherein the method further comprises:
applying Natural Language Processing (NLP) techniques including lemmatization, stop word removal, and Term Frequency-Inverse Document Frequency (TF-IDF) statistics to generate the features of the received cybersecurity incident, wherein the features are based on words included in the received cybersecurity incident.

* * * * *